United States Patent
Jones et al.

(10) Patent No.: US 9,544,495 B2
(45) Date of Patent: Jan. 10, 2017

(54) IMAGE CAPTURING DEVICE WITH TOUCH SCREEN FOR ADJUSTING CAMERA SETTINGS

(71) Applicant: Apple Inc., Cupertino, CA (US)

(72) Inventors: Jeremy Jones, San Jose, CA (US); Nikhil Bhogal, San Francisco, CA (US); Ralph T. Brunner, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 14/177,200

(22) Filed: Feb. 10, 2014

(65) Prior Publication Data

US 2014/0152883 A1    Jun. 5, 2014

Related U.S. Application Data

(63) Continuation of application No. 13/551,360, filed on Jul. 17, 2012, now Pat. No. 8,670,060, which is a continuation of application No. 12/479,705, filed on Jun. 5, 2009, now Pat. No. 8,237,807.

(51) Int. Cl.
| | |
|---|---|
| *H04N 5/222* | (2006.01) |
| *H04N 5/232* | (2006.01) |
| *G06F 3/0488* | (2013.01) |
| *H04N 5/77* | (2006.01) |

(52) U.S. Cl.
CPC ...... *H04N 5/23216* (2013.01); *G06F 3/04883* (2013.01); *H04N 5/23293* (2013.01); *H04N 5/772* (2013.01); *G06F 2203/04808* (2013.01)

(58) Field of Classification Search
CPC ............ H04N 5/23212; H04N 5/23216; H04N 5/23293; G06F 2203/04808; G06F 3/04883
See application file for complete search history.

(56) References Cited

U.S. PATENT DOCUMENTS

| | | |
|---|---|---|
| 7,110,040 B1 | 9/2006 | Misawa |
| 7,129,980 B1 | 10/2006 | Ashida |
| 7,551,899 B1 | 6/2009 | Nicolas et al. |

(Continued)

FOREIGN PATENT DOCUMENTS

JP    H01-193708    8/1989

OTHER PUBLICATIONS

Author Unknown, "Pantech C3b User Guide", Month Unknown, 2007, 101 pages, Pantech Wireless, Inc., Cypress CA, USA.

(Continued)

*Primary Examiner* — Aung S Moe
*Assistant Examiner* — John H Morehead, III
(74) *Attorney, Agent, or Firm* — Blank Rome LLP

(57) ABSTRACT

Several methods for operating a built-in digital camera of a portable, handheld electronic device are described. In one embodiment, the device receives a user selection (e.g., tap, tap and hold, gesture) of a region displayed on the display screen (e.g., touch sensitive screen). A touch to focus mode may then be initiated in response to the user selection and exposure and focus parameters determined and adjusted. Then, an automatic scene detection mechanism can determine whether a scene has changed. If the scene has changed, then the touch to focus mode ends and a default automatic focus mode initiates. This mode sets a new exposure metering area and focus area prior to determining and adjusting exposure and focus parameters, respectively.

16 Claims, 7 Drawing Sheets

(56) References Cited

U.S. PATENT DOCUMENTS

| | | | |
|---|---|---|---|
| 7,769,285 B2 | 8/2010 | Honjo et al. | |
| 8,237,807 B2 | 8/2012 | Jones et al. | |
| 8,670,060 B2 | 3/2014 | Jones et al. | |
| 2004/0179131 A1 | 9/2004 | Honda et al. | |
| 2004/0189856 A1* | 9/2004 | Tanaka | H04N 5/23293 348/345 |
| 2006/0026521 A1 | 2/2006 | Hotelling et al. | |
| 2006/0072028 A1* | 4/2006 | Hong | H04N 5/23216 348/333.01 |
| 2006/0088305 A1* | 4/2006 | Ooka | H04N 5/23212 396/121 |
| 2006/0291816 A1 | 12/2006 | Ozawa | |
| 2007/0018069 A1* | 1/2007 | Higashino | G03B 13/36 250/200 |
| 2007/0097088 A1* | 5/2007 | Battles | G06F 3/03547 345/173 |
| 2007/0127773 A1* | 6/2007 | Ogawa | G06F 17/3079 382/103 |
| 2007/0160359 A1 | 7/2007 | Imamura | |
| 2007/0192782 A1* | 8/2007 | Ramaswamy | H04H 60/37 725/9 |
| 2007/0291152 A1 | 12/2007 | Suekane et al. | |
| 2008/0079837 A1 | 4/2008 | Masubuchi | |
| 2008/0095436 A1 | 4/2008 | Kim et al. | |
| 2008/0117300 A1* | 5/2008 | Shin et al. | 348/191 |
| 2008/0146275 A1 | 6/2008 | Tofflinger | |
| 2008/0168499 A1 | 7/2008 | Kuroiwa et al. | |
| 2008/0193119 A1* | 8/2008 | Miyazaki | G03B 7/16 396/157 |
| 2008/0239114 A1 | 10/2008 | Shin et al. | |
| 2008/0284857 A1 | 11/2008 | Yoshida | |
| 2009/0003817 A1* | 1/2009 | Suzuki | H04N 5/23293 396/124 |
| 2009/0033786 A1 | 2/2009 | Finkelstein et al. | |
| 2009/0174674 A1 | 7/2009 | Forutanpour | |
| 2009/0202235 A1 | 8/2009 | Li et al. | |
| 2009/0244357 A1* | 10/2009 | Huang | H04N 5/23293 348/345 |
| 2009/0295926 A1* | 12/2009 | Miyazaki | H04N 5/23219 348/169 |
| 2010/0020221 A1 | 1/2010 | Tupman et al. | |
| 2010/0110279 A1 | 5/2010 | Koguchi et al. | |
| 2010/0166404 A1* | 7/2010 | Lombardi | G03B 17/00 396/89 |
| 2010/0265344 A1* | 10/2010 | Velarde | H04N 5/232 348/208.16 |
| 2011/0019060 A1* | 1/2011 | Takahashi | H04N 5/232 348/333.01 |
| 2011/0019655 A1 | 1/2011 | Hakola | |
| 2011/0058094 A1* | 3/2011 | Hyodo | G03B 3/12 348/345 |
| 2011/0081141 A1 | 4/2011 | Uenishi | |
| 2011/0141344 A1* | 6/2011 | Abe | G03B 3/00 348/345 |

OTHER PUBLICATIONS

Author Unknown, "iPhone User's Guide For iPhone and iPhone 3G", Month Unknown, 2008, 154 pages, Apple, USA.

Author Unknown, "Nikon Coolpix S230: The Awesome Touch-screen Digital Camera with Best Shot Selector &Eye-Blink Proof mode," Apr. 8, 2009, 5 pages, Gadgetophilia, available at http://gadgetophilia.com/nikon-reappeares-in-the-touchscreen-gadget-market-with-its-touchscreen.

Author Unknown, "Panasonic launches Lumix DMC-FX500 with Touch-Screen," Mar. 19, 2008, 4 pages, Panasonic press Summary, available at http://www.dcviews.com/press/panasonic-FX500.htm.

Peters, Jeremy W., "Long-Awaited iPhone Goes on Sale", Jun. 29, 2007, 2 pages, The New York Times, nytimes.com, USA.

\* cited by examiner

IMAGE CAPTURING DEVICE WITH TOUCH SCREEN FOR ADJUSTING CAMERA SETTINGS

The present application is a continuation of co-pending U.S. application Ser. No. 13/551,360, filed on Jul. 17, 2012, which is a continuation of U.S. application Ser. No. 12/479,705, now issued as U.S. Pat. No. 8,237,807, filed on Jun. 5, 2009, which is related to the commonly-owned, previously-filed provisional application: application Ser. No. 61/083,455, filed Jul. 24, 2008, entitled "CAMERA INTERFACE IN A PORTABLE HANDHELD ELECTRONIC DEVICE," which is incorporated by reference in its entirety herein.

An embodiment of the invention is generally related to image capturing electronic devices, having a touch sensitive screen for controlling camera functions and settings.

BACKGROUND

Image capturing devices include cameras, portable handheld electronic devices, and electronic devices. These image capturing devices can use an automatic focus mechanism to automatically adjust focus settings. Automatic focus (hereinafter also referred to as "autofocus" or "AF") is a feature of some optical systems that allows them to obtain and in some systems to also continuously maintain correct focus on a subject, instead of requiring the operator to adjust focus manually. Automatic focus often uses a computer to run a miniature motor that focuses the lens for you. Focusing is the moving of the lens in and out until the sharpest possible image of the subject is projected onto the film or other image sensor. Depending on the distance of the subject from the camera, the lens has to be a certain distance from the film to form a clear image.

A conventional camera automatically focuses on the center of a display (e.g., viewfinder) or automatically selects a region of the display to focus (e.g., identifying faces using face detection algorithms). Alternatively, the camera overlays several focal boxes on a preview display through which a user can cycle and select, for example, with a half-press of button (e.g., nine overlaid boxes in SLR cameras). To focus on a target subject, a user also may center a focal region on a random subject, hold the focus, and subsequently move the camera so that the focal region is centered at the target subject.

SUMMARY

Several methods for operating a built-in digital camera of a portable, handheld electronic device are described. In one embodiment, the device receives a user selection (e.g., tap, tap and hold, gesture) of a region displayed on the display screen (e.g., touch sensitive display screen). A touch to focus mode may then be initiated and an exposure metering area can then automatically be determined based on the user selection and displayed on the screen. Then a focus area can be automatically determined based on the user selection and an automatic focus scan initiated for the focus area. Next, the automatic exposure mechanism adjusts exposure parameters based on the metering area.

In another embodiment, the display screen is a touch sensitive screen and the user selection is one of a tap, a tap and hold, a single finger gesture, and a multi-finger gesture.

In another embodiment, an automatic detect scene change mechanism is executed. This mechanism can automatically monitor a luminance distribution of the selected region for each image captured by the device during the touch to focus mode. The mechanism automatically compares a first luminance distribution of the selected region for a first image and a second luminance distribution of the selected region for a second image. Then, the mechanism automatically determines whether a scene has changed by comparing first and second luminance distributions of the selected region for the respective first and second images. If a scene has changed, then the mode changes to a continuous automatic focus mode in which the exposure metering area is based on the full screen and the focus area automatically moves from the selected region to a center of the screen.

These operations can be initiated after the device enters an image capturing mode or other mode. For example, the device may have many functions and capabilities (e.g., the device may be a smart phone or personal digital assistant (PDA) which can send and receive emails, allow surfing of the internet, create documents, and also act as a camera), and a user can place the device into camera mode in order to cause it to begin these operations. In an embodiment, the device is not performing these operations when it is not in camera mode.

Other embodiments are also described. The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar regions. It should be noted that references to "an" or "one" embodiment of the invention in this disclosure are not necessarily to the same embodiment, and they mean at least one.

DETAILED DESCRIPTION

Several methods for operating a built-in digital camera of a portable, handheld electronic device are described. In one embodiment, the device receives a user selection (e.g., tap, tap and hold, gesture) of a region displayed on the display screen (e.g., touch sensitive display screen). A touch to focus mode may then be initiated and an exposure metering area can then automatically be determined based on the user selection and displayed on the screen. Then a focus area can be automatically determined based on the user selection and an automatic focus scan initiated for the focus area. Next, the automatic exposure mechanism adjusts exposure parameters based on the metering area.

An automatic detect mechanism may also be implemented to determine when a scene changes. In one embodiment, this mechanism can automatically monitor a luminance distribution of the selected region for images captured by the device during the touch to focus mode. The mechanism automatically compares a first luminance distribution of the selected region for a first image and a second luminance distribution of the selected region for a second image. Then, the mechanism automatically determines whether a scene has changed by comparing first and second luminance distributions of the selected region for the respective first and second images. If a scene has changed, then the mode changes to a default automatic focus mode in which the exposure metering area is based on the full screen and the focus area automatically moves from the selected region to a center of the screen.

A user can easily select a region for automatic exposure and focus adjustments during a touch to focus mode. An automatic scene change mechanism determines whether a scene has changed and alters the exposure and focus areas if necessary.

In this section several embodiments of this invention are explained with reference to the appended drawings. The shapes, relative positions and other aspects of the parts described in the embodiments are not limited only to those shown, which are meant merely for the purpose of illustration.

Figure 1:
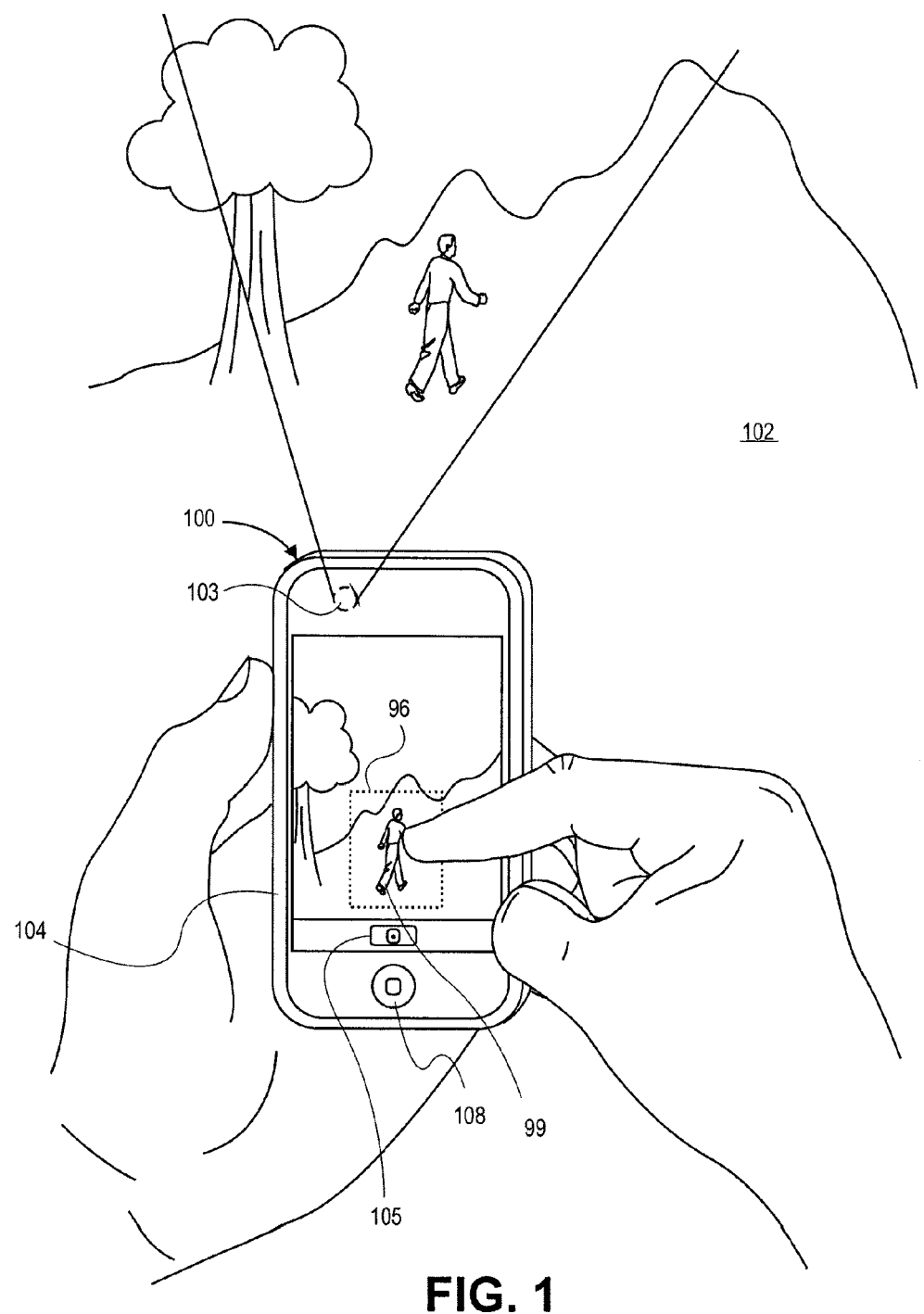
FIG. 1 shows a portable handheld device having a built-in digital camera and a touch sensitive screen, in the hands of its user undergoing a tap selection during an image capture process, in accordance with one embodiment.

FIG. 1 shows an image capturing device 100, which can be a portable handheld electronic device, having a built-in digital camera and a touch sensitive screen 104 in the hand of its user, undergoing a user selection (e.g., tap, tap and hold, gesture) during an image capture process. The device 100 may be an IPHONE device by Apple Inc., of Cupertino, Calif. Alternatively, it could be any other portable handheld electronic device that has a built-in digital camera and a touch sensitive screen. The built-in digital camera includes a lens 103 located in this example on the back face of the device 100. The lens may be a fixed optical lens system or it may have focus and optical zoom capability. Although not depicted in FIG. 1, inside the device 100 are an electronic image sensor and associated hardware circuitry and running software that can capture digital images or video of a scene 102 that is before the lens 103.

The digital camera functionality of the device 100 includes an electronic or digital viewfinder. The viewfinder displays live, captured video (e.g., series of images) or still images of the scene 102 that is before the camera, on a portion of the touch sensitive screen 104 as shown. In this case, the digital camera also includes a soft or virtual shutter button whose icon 105 is displayed by the screen 104, directly below the viewfinder image area. As an alternative or in addition, a physical shutter button may be implemented in the device 100. In one embodiment, the device 100 may be placed in either the digital camera mode or the mobile telephone mode, in response to, for example, the user actuating a physical menu button 108 and then selecting an appropriate icon on the touch sensitive screen 104. The device 100 includes all of the needed circuitry and/or software for implementing the digital camera functions of the electronic viewfinder, shutter release, and automatic image capture parameter adjustment (e.g., automatic exposure, automatic focus, automatic detection of a scene change) as described below.

In FIG. 1, the user can perform a selection on the touch sensitive screen 104 as shown by, for example, tapping the screen with a stylus or finger. The user positions the tap selection on a preview portion of the touch screen. The device 100 has detected this tap and has automatically drawn a metering area 96 (in this case, the closed contour that has a box shape), centered around the location of the touch down, the subject 99. The user may lift off his finger, which in turn can signal the camera to accept the final location of the user selection and the underlying portion of the image as the selected region of the scene. Once the user has finalized the selection of this selected region, he can command the digital camera to take a picture or record video, after the image capture parameters are automatically adjusted based on the selected region. A flow diagram of operations for automatically adjusting these parameters, in accordance with the above, is shown in FIG. 2.

Figure 2:
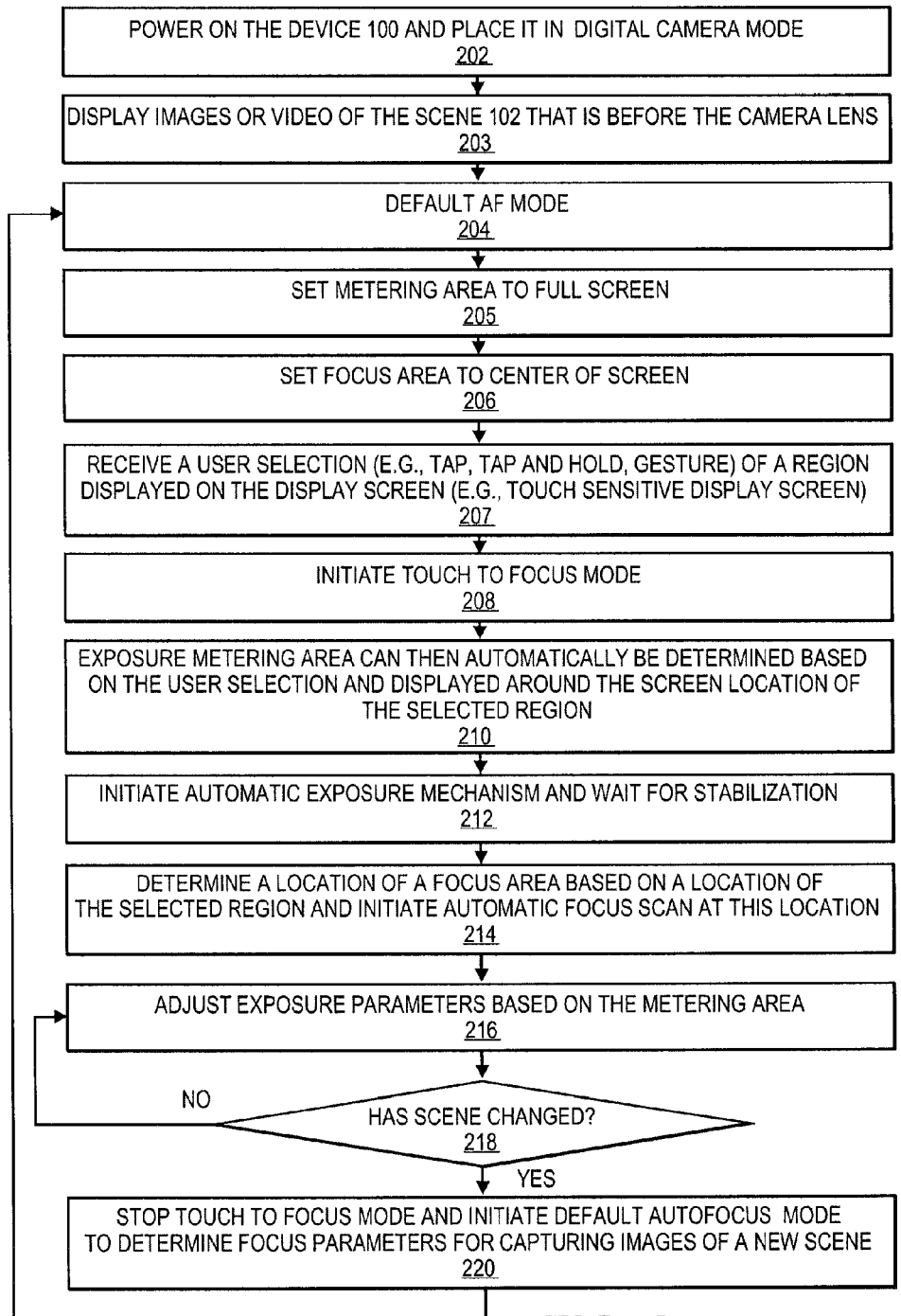
FIG. 2 is a flow diagram of operations in the electronic device during an image capture process, in accordance with one embodiment.

FIG. 2 is a flow diagram of operations in the electronic device during an image capture process, in accordance with one embodiment. After having powering on the device 100 and placing it in digital camera mode at block 202, a view finder function begins execution which displays still images or video (e.g., a series of images) of the scene 102 that is before the camera lens 103 at block 203. The user aims the camera lens so that the desired portion of the scene appears on the preview portion of the screen 104. A default autofocus mode is initiated once the camera is placed in the digital camera mode. The default autofocus mode can determine focus parameters for captured images or video of the scene at block 204. The default automatic focus mode can set an exposure metering area to substantially full-frame and corresponding full-screen at block 205. The default automatic focus mode can set the focus area to a center of frame and corresponding center of the screen at block 206. The continuous automatic focus mode is used to detect when a subject is out of focus and then estimate new focus parameters to refocus the lens with respect to the subject.

While monitoring the screen, a camera application (or a touch screen application) running in the device 100 receives a user selection (e.g., tap, tap and hold, gesture) of a region displayed on the display screen (e.g., touch sensitive display screen) and then stores screen coordinates of its location at block 207. A touch to focus mode may then be automatically initiated in response to the user selection at block 208 and an exposure metering area can then automatically be determined based on the user selection and displayed on the screen at block 210. The exposure metering area may be displayed as a contour surrounding the region selected by the user and have predetermined dimensions based on a location of the user selection with respect to the screen.

In an embodiment, the selected region is moved around the preview portion of the touch screen, in lock step with the user moving her finger gesture along the surface of the touch screen. This selected region may be finalized, for example, in response to the user lifting off his finger. The selected region of the image may be a predicted region of pixels that are about coextensive with the location of the user selection. Alternatively, the selected region may be an object in the scene located at or near the location of the user selection, as detected by the camera application using digital image processing techniques. Alternatively, the user can adjust the dimensions of the selected region, for example, by moving anchors defining the dimensions of the selected region, which can also be touch-based.

Once the metering area has been determined, an automatic exposure mechanism, which may be executed by a processing circuit or processing logic, is initiated and allowed to stabilize at block 212. Next, an automatic focus scan, which may be executed by the processing circuit or processing logic, is initiated based on the location of the selected region at block 214. In one embodiment, a focus area is associated with the selected region and is set at approximately the same location and size as the selected region. The device automatically focuses on a portion of a scene using a focus area associated with the selected region.

Next, the automatic exposure mechanism can determine exposure parameters using the metering area at block 216. Exposure parameters (e.g., exposure time, integration time of image sensor) can be adjusted based upon characteristics (e.g., brightness) of the metering area. The exposure mechanism may use flat metering using all pixels of the metering area or center weighted metering.

In an alternative embodiment, separate user selections can determine the exposure metering area and the focus area. For example, a first user selection (e.g., tap and hold) determines the metering area and a second user selection (e.g., tap) determines the focus area.

In some embodiments, the processing logic can automatically determine whether a portion of the scene associated with the focus area has changed by monitoring a luminance distribution of the focus area at block 218. If a scene has not changed, then the method returns to block 216 for continuous adjustment of automatic exposure if necessary. If the scene has changed at block 218, then the touch to focus mode stops at block 220 and the method returns to the default autofocus mode to determine focus parameters for captured images or video of the new scene at block 204. More details regarding detection of a changed scene are discussed in FIG. 3.

In one embodiment, the default autofocus mode is a continuous automatic focus mode that can set the exposure metering area to substantially full-frame and corresponding full-screen. The continuous automatic focus mode can move the focus area from the selected region to a center of frame and corresponding center of the screen. Alternatively, data from the histograms or an image contrast source may be evaluated to determine a new location and size of the focus area.

The continuous automatic focus mode is used to detect when a subject is out of focus and then estimate new focus parameters to refocus the lens with respect to the subject. The continuous automatic focus mode can perform an automatic focus scan for a lens of the image capturing device and obtains focus scores associated with the automatic focus scan. In an embodiment, a focus score is a scene-dependent measure of contrast. Next, the autofocus mechanism can determine whether a current focus score is within an acceptable band of focus scores. A refocus scan is needed if the current focus score is outside of the acceptable band of focus scores.

Figure 3:
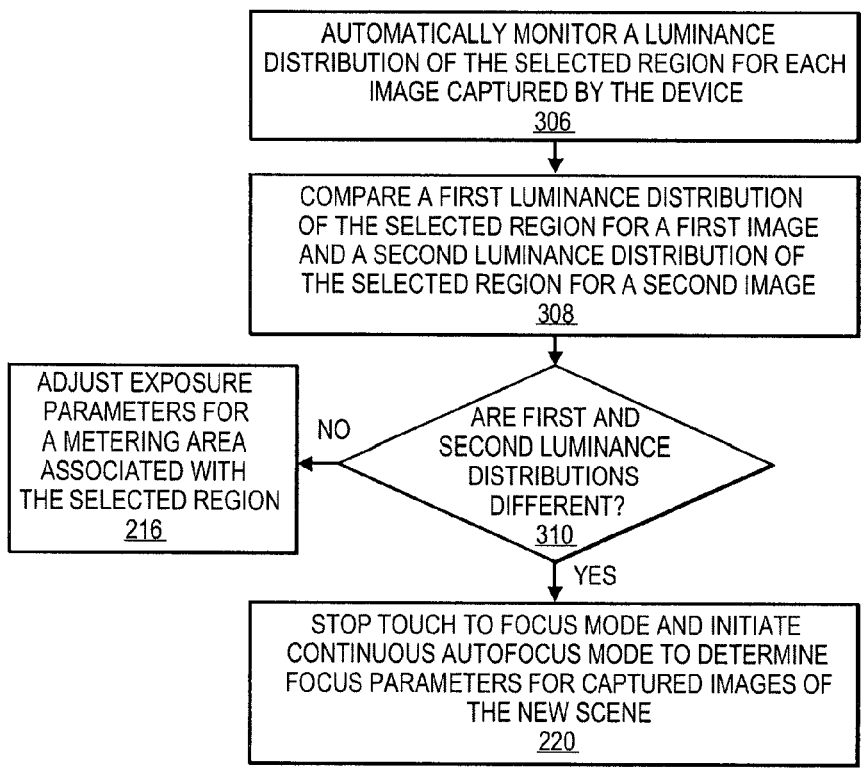
FIG. 3 is a flow diagram of operations in the electronic device during an image capture process, in accordance with some embodiments.

FIG. 3 is a flow diagram of operations in the electronic device during an image capture process to determine whether a scene has changed, in accordance with certain embodiments. As discussed above at block 203 of FIG. 2, processing logic can display on the display screen images or video captured by the image capturing device. The processing logic can receive a user selection of a region (e.g., selected region) displayed on the display screen, which initiates a touch to focus mode, as discussed in block 207 and 208 of FIG. 2. In an embodiment, the display screen is a touch sensitive screen and the user selection is one of a tap, a tap and hold, a single finger gesture, and a multi-finger gesture. An exposure metering area and focus area may be based upon an approximate size and location of the selected region. These metering and focus areas are used for adjusting exposure and focus parameters, respectively.

After the operations of blocks 202-216 are completed as discussed above, at block 306 of FIG. 3, the processing logic, executing an automatic detect mechanism, can automatically monitor a luminance distribution of the selected region associated with a focus area for each image captured by the device. At block 308, the processing logic automatically compares a first luminance distribution of the selected region for a first image and a second luminance distribution of the selected region for a second image. At block 310, the processing logic automatically determines whether the first and second luminance distributions of the selected region for the respective first and second images are different by a predetermined value. The automatic detect mechanism may be continuously performed to determine whether a scene or a portion of scene associated with the focus area has changed by comparing luminance distributions for the focus area of different images.

In one embodiment, a vector having numerous elements (e.g., 16) can be represented as histogram. A histogram of luminance distribution for the first image can be compared with a histogram of luminance distribution for the second image. If values of the first and second luminance distributions are approximately equal to each other or within a predetermined value of each other, then the touch to focus mode adjusts exposure parameters for the exposure metering area associated with the selected region as discussed at block 216 of FIG. 2. If the scene or portion of the scene associated with the focus area has changed, then the touch to focus mode stops and a default automatic focus mode is initiated to determine focus parameters for captured images of the new scene as discussed at block 220 of FIG. 2.

Figure 4:
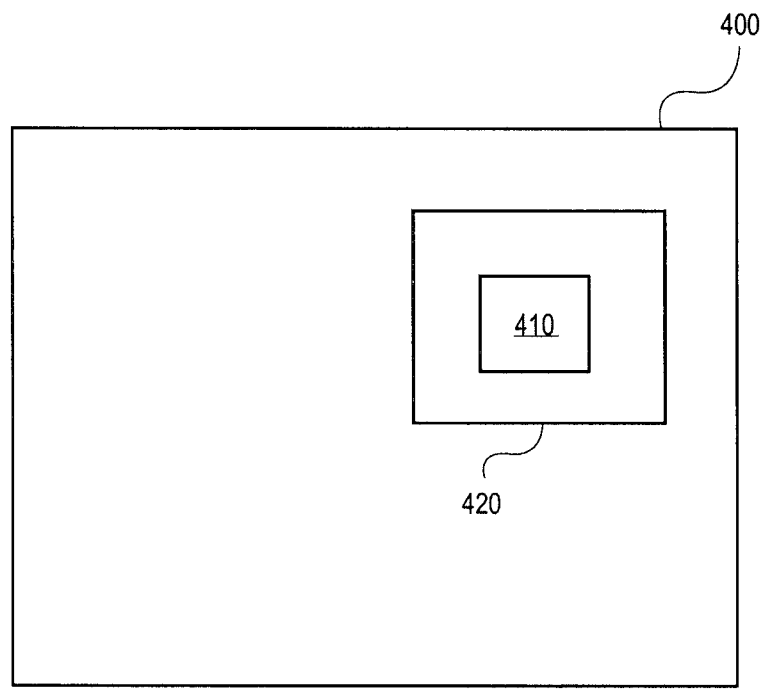
FIG. 4 illustrates a display screen of an image capturing device, in accordance with one embodiment.

FIG. 4 illustrates a display screen of an image capturing device in accordance with one embodiment. A selected region 410 is selected by a user touching a touch sensitive screen 400 in some manner (e.g., tap, tap and hold, single touch gesture, multi-touch gesture) with a user input (e.g., finger, thumb, stylus, etc.). The selected region may represent approximately a location and a size of the user selection. The user selection triggers a touch to focus mode, which initiates an automatic exposure mechanism. This mechanism determines a size and location of an exposure metering area 420 based on the size and/or location of the selected region. For example, the metering area may form a contour surrounding the selected region. In an embodiment, the exposure metering area 420 is displayed to the user while the selected region 410 is not displayed to the user. A focus area may be similar to the size and location of the selected region. Automatic exposure and focus mechanisms adjust exposure and focus parameters, respectively, as described in the flow charts of FIGS. 2 and 3. An automatic detect mechanism then determines whether a scene changes. If a scene changes, then the touch to focus mode terminates and a default automatic focus mode starts (e.g., continuous automatic focus mode). The exposure and focus areas are then automatically adjusted as illustrated in FIG. 5.

Figure 5:
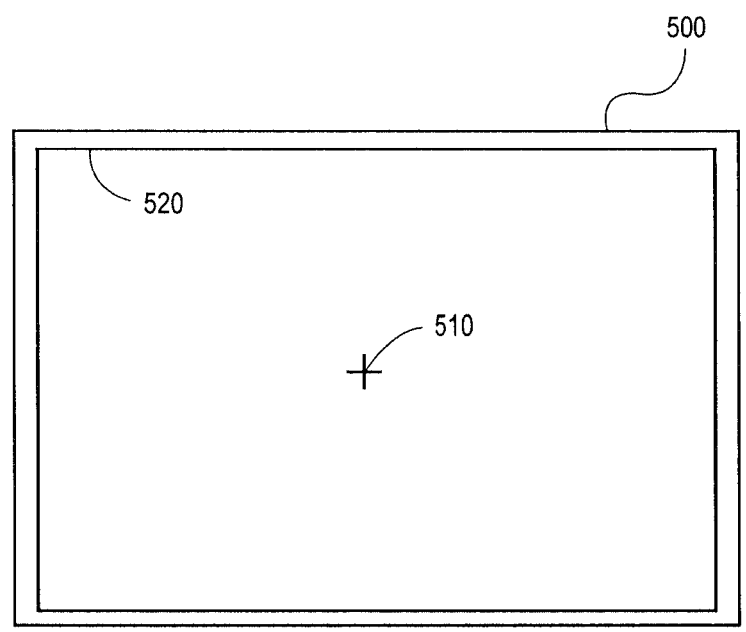
FIG. 5 illustrates a display screen of an image capturing device in accordance with an embodiment.

FIG. 5 illustrates a display screen of an image capturing device in accordance with an embodiment. A focus area (not shown) is centered with respect to a center 510 of the display screen 500. The default automatic focus mechanism determines a size and location of an exposure metering area 520 in response to a scene change determination. The exposure metering area can be approximately equal to a full screen size as illustrated in FIG. 5. The focus area may be similar in size compared to the metering area 520 or a different size.

Figure 6:
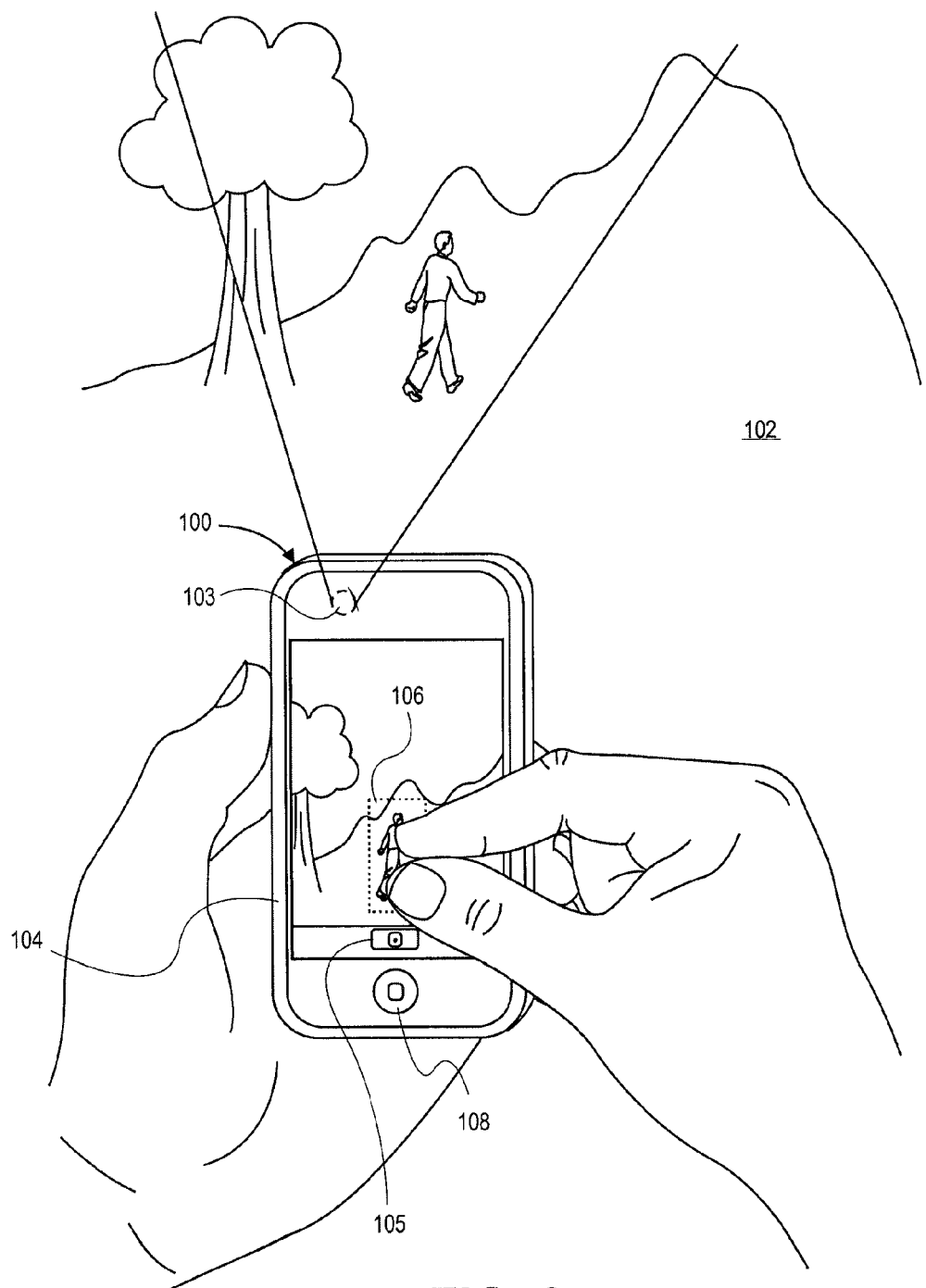
FIG. 6 shows the portable handheld electronic device undergoing a multi-finger gesture during an image capture process, in accordance with an embodiment.

FIG. 6 shows the portable handheld electronic device undergoing a multi-finger gesture during an image capture process, in accordance with an embodiment. In particular, the thumb and index finger are brought close to each other or touch each other, simultaneously with their tips being in contact with the surface of the screen 104 to create two contact points thereon. The user positions this multi-touch gesture, namely the two contact points, at a location of the image of the scene 102 that corresponds to an object in the scene (or portion of the scene) to which priority should be given when the digital camera adjusts the image capture parameters in preparation for taking a picture of the scene. In this example, the user has selected the location where a person appears between a mountainside in the background and a tree in the foreground.

In response to detecting the multi-touch finger gesture, the device 100 may cause a contour 106, in this example, the outline of a box, to be displayed on the screen 104, around the location of the detected multi-finger gesture. The contour 106 is associated, e.g. by software running in the device 100, with an exposure metering area for setting exposure parameters. The user can then contract or expand the size of the metering area, by making a pinching movement or a spreading movement, respectively, with her thumb and index fingers of her hand while the fingertips remain in contact with the touch sensitive screen 104. The device 100 has the needed hardware and software to distinguish between a pinching movement and a spreading movement, and appropriately contracts or expands the size of the metering area. Gesture movements may include single or multi-point gestures (e.g., circle, diagonal line, rectangle, reverse pinch, polygon).

Figure 7:
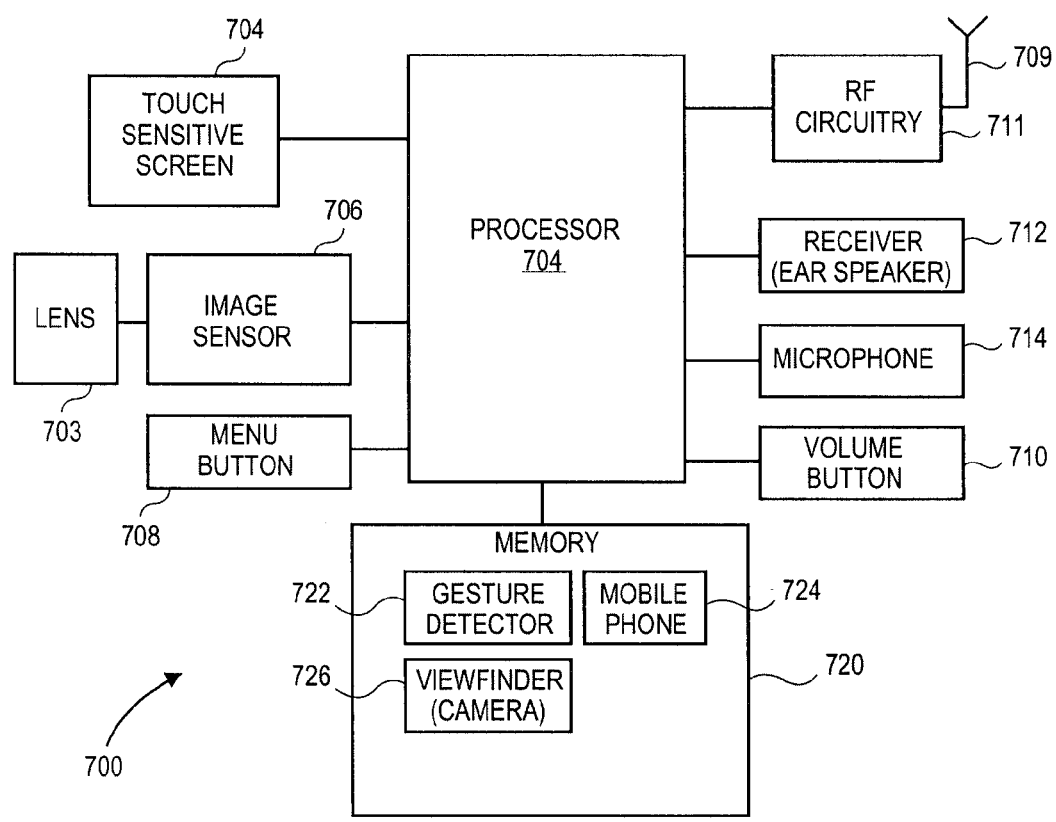
FIG. 7 shows a block diagram of an example, portable handheld multifunction device in which an embodiment of the invention may be implemented.

Turning now to FIG. 7, a block diagram of an example image capturing device 700 is shown, in accordance with an embodiment of the invention. The device 700 may be a personal computer, such as a laptop, tablet, or handheld computer. Alternatively, the device 700 may be a cellular phone handset, personal digital assistant (PDA), or a multi-function consumer electronic device, such as the IPHONE device.

The device 700 has a processor 704 that executes instructions to carry out operations associated with the device 700. The instructions may be retrieved from memory 720 and, when executed, control the reception and manipulation of input and output data between various components of device 700. Memory 720 may be or include a machine-readable medium.

Although not shown, the memory 720 may store an operating system program that is executed by the processor 704, and one or more application programs are said to run on top of the operating system to perform different functions described below. The touch sensitive screen 704 displays a graphical user interface (GUI) to allow a user of the device 700 to interact with various application programs running in the device 700. The GUI displays icons or graphical images that represent application programs, files, and their associated commands on the screen 704. These may include windows, fields, dialog boxes, menus, buttons, cursors, scrollbars, etc. During operation, the user can select and activate various graphical images to initiate functions associated therewith.

The touch screen 704 also acts as an input device, to transfer data from the outside world into the device 700. This input is received via, for example, the user's finger(s) touching the surface of the screen 704. The screen 704 and its associated circuitry recognize touches, as well as the position and perhaps the magnitude of touches and their duration on the surface of the screen 704. These may be done by a gesture detector program 722 that may be executed by the processor 704. Note that a dedicated processor may be provided to process touch inputs, in order to reduce demand for a main processor of the system. The touch sensing capability of the screen 704 may be based on technology such as capacitive sensing, resistive sensing, or other suitable solid state technologies. The touch sensing may be based on single point sensing or multi-point or multi-touch sensing. Single point touch sensing is capable of only distinguishing a single touch, while multi-point sensing is capable of distinguishing multiple touches that occur at the same time.

Still referring to FIG. 7, camera functionality of the device 700 may be enabled by the following components. An image sensor 706 (e.g., CCD, CMOS based device, etc.) is built into the device 700 and may be located at a focal plane of an optical system that includes the lens 703. The image sensor may include or be integrated with an imaging sensing unit that performs image processing for images captured by the image sensor. An optical image of a scene before the camera is formed on the image sensor 706, and the sensor 706 responds by capturing the scene in the form of a digital image or picture or video consisting of pixels that will then be stored in memory 720. The image sensor 706 may include an image sensor chip with several options available for controlling how an image is captured. These options are set by image capture parameters that can be adjusted automatically, by the camera application 728. The application 728 can make automatic adjustments (e.g., automatic exposure mechanism, automatic focus mechanism, automatic scene change detection, continuous automatic focus mechanism), that is without specific user input, to focus, exposure and other parameters based on a selected portion of the scene that is to be imaged.

In some embodiments, the image capturing device 700 includes a built-in digital camera and a touch sensitive screen. The digital camera includes a lens to form optical images stored in memory. The touch sensitive screen, which is coupled to the camera, displays the images or video. The device further includes a processing system (e.g., processor 704), which is coupled to the screen. The processing system may be configured to receive a user selection (e.g., a tap, a tap and hold, a single finger gesture, and a multi-finger gesture) of a region displayed on the touch sensitive screen. The processing system may be further configured to initiate a touch to focus mode based on the user selection. The touch to focus mode automatically focuses using a focus area associated with the selected region. The processing system may be configured to automatically monitor a luminance distribution of the focus area for images captured by the device to determine whether a portion of a scene associated with the selected region has changed.

The processing system may be configured to automatically determine a location of the focus area based on a location of the selected region. The processing system may be configured to terminate the touch to focus mode if the scene changes and to initiate a default automatic focus mode. For the default automatic focus mode, the processing system can set an exposure metering area to substantially full screen, rather than being based on the selected region.

For the default automatic focus mode, the processing system can move a location of the focus area from the selected region to a center of the screen.

Still referring to FIG. 7, the device 700 may operate not just in a digital camera mode, but also in a mobile telephone mode. This is enabled by the following components of the device 700. An integrated antenna 709 that is driven and sensed by RF circuitry 711 is used to transmit and receive cellular network communication signals from a nearby base station (not shown). A mobile phone application 724 executed by the processor 704 presents mobile telephony options on the touch sensitive screen 104 for the user, such as a virtual telephone keypad with call and end buttons. The mobile phone application 724 also controls at a high level the two-way conversation in a typical mobile telephone call, by allowing the user to speak into the built-in microphone 714 while at the same time being able to hear the other side of the conversation through the receive or ear speaker 712. The mobile phone application 724 also responds to the user's selection of the receiver volume, by detecting actuation of the physical volume button 710. Although not shown, the processor 704 may include a cellular base band processor that is responsible for much of the digital audio signal processing functions associated with a cellular phone call, including encoding and decoding the voice signals of the participants to the conversation.

The device 700 may be placed in either the digital camera mode or the mobile telephone mode, in response to, for example, the user actuating a physical or virtual (soft) menu button 708 (e.g., 108 in FIGS. 1 and 5) and then selecting an appropriate icon on the display device of the touch sensitive screen 704. In the telephone mode, the mobile phone application 724 controls loudness of the receiver 712, based on a detected actuation or position of the physical volume button 710. In the camera mode, the camera application 728 can respond to actuation of a button (e.g., the volume button 710) as if the latter were a physical shutter button (for taking pictures). This use of the volume button 710 as a physical shutter button may be an alternative to a soft or virtual shutter button whose icon is simultaneously displayed on the display device of the screen 704 during camera mode and is displayed near the preview portion of the display device of the touch sensitive screen 704.

An embodiment of the invention may be a machine-readable medium having stored thereon instructions which program a processor to perform some of the operations described above. In other embodiments, some of these operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), not limited to Compact Disc Read-Only Memory (CD-ROMs), Read-Only Memory (ROMs), Random Access Memory (RAM), and Erasable Programmable Read-Only Memory (EPROM).

Figure 8:
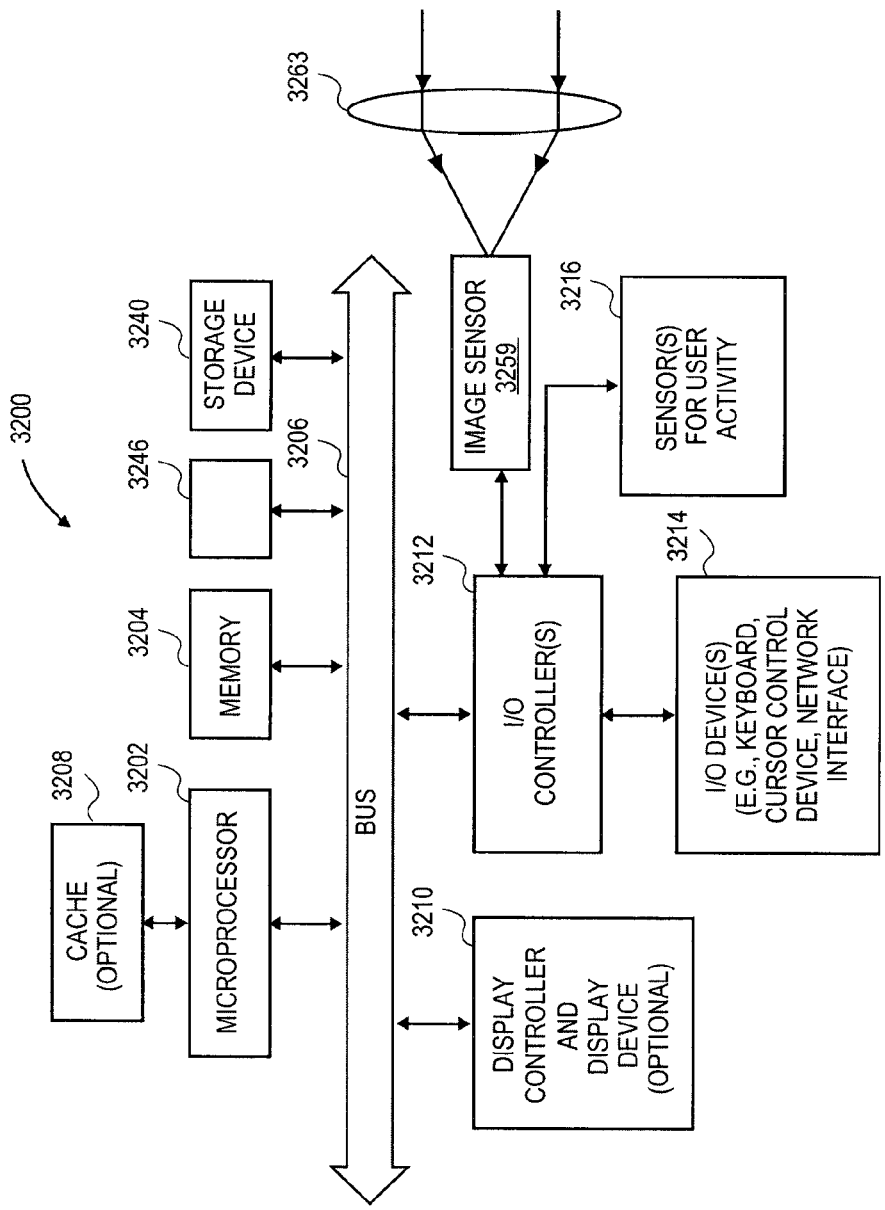
FIG. 8 shows an example of a data processing system, in accordance with an embodiment of the present invention.

FIG. 8 shows an example of a data processing system according to an embodiment of the present invention. This data processing system 3200 may include a processor, such as microprocessor 3202, and a memory 3204, which are coupled to each other through a bus 3206. The data processing system 3200 may optionally include a cache 3208 which is coupled to the microprocessor 3202. The data processing system may optionally include a storage data processing system 3240 which may be, for example, any type of solid-state or magnetic memory data processing system. Storage data processing system 3240 may be or include a machine-readable medium.

This data processing system may also optionally include a display controller and display data processing system 3210 which is coupled to the other components through the bus 3206. One or more input/output controllers 3212 are also coupled to the bus 3206 to provide an interface for input/output data processing systems 3214 and to provide an interface for one or more sensors 3216 which are for sensing user activity. The bus 3206 may include one or more buses connected to each other through various bridges, controllers, and/or adapters as is well known in the art. The input/output data processing systems 3214 may include a keypad or keyboard or a cursor control data processing system such as a touch input panel. Furthermore, the input/output data processing systems 3214 may include a network interface which is either for a wired network or a wireless network (e.g. an RF transceiver). The sensors 3216 may be any one of the sensors described herein including, for example, a proximity sensor or an ambient light sensor. Image sensor 3259 captures an image via light focused by lens 3263.

In certain embodiments of the present disclosure, the data processing system 3200, device 700, or combination of system 3200 and device 700 can be used to implement at least some of the methods discussed in the present disclosure.

The invention is not limited to the specific embodiments described above. There are numerous other variations to different aspects of the invention described above, which in the interest of conciseness have not been provided in detail. Accordingly, other embodiments are within the scope of the claims.

What is claimed is:

1. A method to capture digital images, the method comprising:
   receiving a multi-touch input from a display screen of an image capture device;
   identifying, in response to the multi-touch input, a first selected region;
   adjusting the first selected region to a second selected region in response to a change in the received multi-touch input;
   defining a first focus area based on the second selected region;
   automatically monitoring pixel brightness in a portion in each of one or more images captured by the image capture device, the portion is based on the first focus area; and
   automatically adjusting at least one exposure parameter of the image capture device based on the monitored pixel brightness.

2. The method of claim 1 further comprising resetting the first focus area to a default focus area when changes to the pixels brightness in the region corresponding to the first focus area in at least one of the one or more images indicate a scene change.

3. The method of claim 2, wherein the change to pixel brightness that indicated a scene change comprises a luminance histogram of luminance distributions of the at least one of the one or more images, that are not approximately equal.

4. The method of claim 1 further comprising displaying a contour surrounding the second selected region wherein the multi-touch input comprises a pinching movement, thereby shrinking a size of the contour.

5. The method of claim 1, wherein the image capture device and display screen are part of a hand-held device.

6. An electronic device, comprising:
a digital image capture unit;
a multi-point touch sensitive screen coupled to the digital image capture unit, wherein the screen is for displaying an image and receiving a multi-point touch selection of a region on the screen; and
a processing system coupled to the screen, wherein the processing system is configured to:
detect a multi-touch input from the screen;
define selected region based on the multi-touch input;
monitor, automatically, pixel brightness in the selected region for each of one or more images captured by the digital image capture unit and
determine, based on the monitored pixel brightness, whether a scene being captured by the digital image capture unit has changed; and
adjust, automatically, at least one exposure parameter while the scene remains unchanged.

7. The electronic device of claim 6, wherein the multi-touch input comprises a spreading movement, thereby enlarging the selected region.

8. The electronic device of claim 6, wherein the digital image capture unit has an image sensor.

9. The electronic device of claim 6, wherein at the least one parameter comprises an exposure time.

10. The electronic device of claim 6, wherein at the least one exposure parameter comprises an integration time.

11. A non-transitory machine readable medium storing a program for execution by at least one processing unit of an electronic device, the electronic device having a built-in image capture device and a display screen for displaying captured images, the program comprising sets of instructions for:
receiving a multi-touch input from a display screen of an image capture device;
identifying, in response to the multi-touch input, a selected region with an exposure metering area on the display screen;
monitoring pixel brightness, in the exposure metering area, of one or more images captured by the image capture device in order to determine at least one exposure parameter for the image capture device;
determining, based on the monitored pixel brightness, whether a scene being captured by the image capture device has changed; and
automatically adjusting at least one exposure parameter while the scene has not changed.

12. The non-transitory machine readable medium of claim 11, wherein the set of instructions for automatically adjusting the at least one exposure parameter further comprises a set of instructions for adjusting the at least one exposure parameter according to a center weighted metering of the pixel brightness within the exposure metering area.

13. The non-transitory machine readable medium of claim 11, wherein the set of instructions determining whether a scene being captured by the image capture device has changed comprises a metering delta where the one or more images captured by the image capture device are not approximately the same.

14. The non-transitory machine readable medium of claim 11, wherein the at least one exposure parameter comprises exposure time.

15. The non-transitory machine readable medium of claim 11, wherein the at least one exposure parameter comprises integration time.

16. The non-transitory machine readable medium of claim 11, wherein the set of instructions for identifying, in response to the multi-touch input, a selected region as the exposure metering area further comprises a set of instructions for determining a size and a location for the exposure metering area.

* * * * *